Aug. 1, 1933.  L. P. HUTT  1,920,749
STARTING MEANS FOR A SPLIT PHASE MOTOR
Filed March 26, 1930
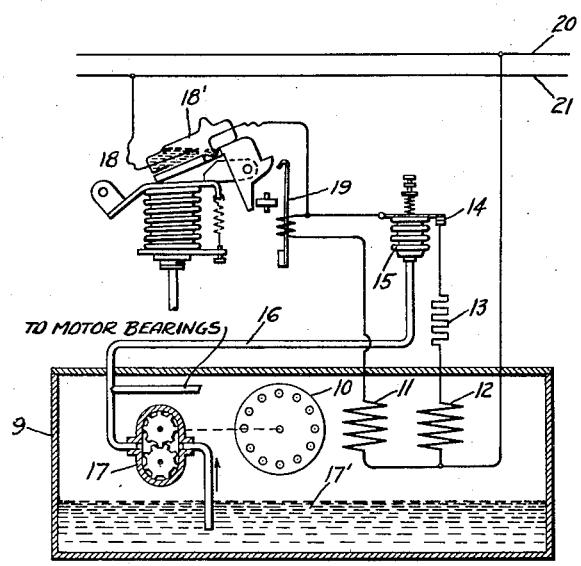
Inventor:
Leonard P. Hutt,
by Charles E. Tullar
His Attorney.

Patented Aug. 1, 1933

1,920,749

UNITED STATES PATENT OFFICE 1,920,749

STARTING MEANS FOR A SPLIT PHASE MOTOR

Leonard P. Hutt, Schenectady, N. Y., assignor to General Electric Company, a Corporation of New York Application March 26, 1930. Serial No. 439,204

3 Claims. (Cl. 172—279)

My invention relates to motor control devices, more particularly to control devices for electric motors of the split phase type.

In electric refrigerators, a split phase motor ordinarily is used to operate the compressor of the refrigerating apparatus. The motor operates in an atmosphere of sulphur dioxide which is a very corrosive gas and prevents the use of one usual method of starting a split phase motor, that is, the method using a slip ring and brush lifting apparatus. Such a starting means is subject to corrosion and the parts are subject to sticking which results in very unstable operation of the starting means.

It is, therefore, an object of my invention to provide an improved form of starting means which eliminates the necessity of the use of slip ring and brush lifting mechanism for a split phase motor.

A further object of my invention is to provide a means for starting a split phase motor which is not affected by the atmospheric conditions under which the motor operates.

Another object of my invention is to protect an electric motor of the type described against failure of lubrication.

It is another object of my invention to provide a simple and reliable means for starting a split phase motor which is responsive to the motor speed.

These and other objects will apear hereinafter.

In the preferred embodiment of my invention, the running winding and the starting winding are initially placed across the line to energize the motor. A pressure responsive switch is placed in series with the starting winding. Directly connected to the motor is a pressure creating means which creates a pressure for operating the pressure responsive means to open the switch in series with the starting winding after the motor has been started. I show the preferred embodiment of my invention used in connection with a refrigerator apparatus but it is understood that the method of starting the motor has a broader application.

A better understanding of my invention will be attained by reference to the accompanying drawing wherein I have shown my invention diagrammatically as applied to a refrigerator.

Referring now to the drawing, I have shown my invention in one form as applied to a split phase motor provided with a rotor 10, a running winding 11 and a starting winding 12. A current limiting resistor 13, and circuit controlling device provided with the contacts 14 and the pressure-responsive element 15 are connected in series with the starting winding. A pump 17 is directly connected to the motor 10 and is provided with the communicating tube or pipe 16 through which pressure is transmitted from the pump 17 to the pressure-responsive device 15. This pump 17 takes the oil from the oil reservoir 17' to lubricate the bearings of the motor as indicated on the drawing and to build up a pressure in the communicating pipe 16. Such a pump for lubricating bearings in an enclosed refrigerator apparatus is shown in U. S. Patent No. 1,736,635 of Nov. 19, 1929, to Steenstrup. This patent is assigned to the same assignee as the present application. The motor and pump are hermetically sealed in casing 9. A thermostatic switch mechanism designated generally by the numeral 18 and provided with the overload device 19 connects the motor across the lines 20 and 21.

The operation of the device is as follows: When the thermostatic switch 18 actuates the mercury tube 18' to close the contacts thereof, it places both the running winding 11 and the starting winding 12 across the lines 20 and 21 to energize the same. This produces a current in the two windings and developes a torque which starts the motor. When the motor starts, it begins to turn the pump 17 so that at running speed a pressure is developed by the pump which is sufficient to actuate the pressure-responsive means 15 to open the contacts 14. This, of course, opens the circuit through the starting winding.

If the motor should stall, the pressure in the pump 17 falls off so that the pressure-responsive device 15 permits the contacts 14 to again place the starting winding across the line. The resulting current through the heating coil of the overload device 19 releases the switch mechanism 18 to open the switch and thus disconnect the motor from the lines 20 and 21.

It will thus be seen that by means of my invention, all of the opening and closing circuit means and the moving parts therefor are not affected by the atmosphere in which the motor operates. The device, though simple, is positive in action and eliminates the necessity of using the brush lifting mechanism which is usually means adopted for starting the split phase motor.

The embodiment of the invention illustrated and described herein has been selected for the purpose of clearly setting forth the principles involved. It will be apparent, however, that the invention is susceptible of being modified to meet the different conditions encountered in its use.

I, therefore, aim to cover by the appended claims all modifications within the true spirit and scope of my invention.

What I claim as new and desire to secure by Letters Patent of the United States is:

1. In combination, a motor provided with a running winding and a starting winding, an automatic switch means for energizing said running winding and starting winding to start the motor, an overload device for opening said automatic switch means, a circuit controlling means in series with said starting winding and biased to circuit closing position, pressure responsive means for operating said circuit-controlling means to the open position, a pressure lubricating pump connected to said pressure responsive means and to the bearings of said motor for directly energizing said pressure responsive means while lubricating the bearings of the motor, and connecting means between said pump and said motor to drive said pump when the motor is started whereby said pressure responsive means will open said circuit-controlling means in response to the running motor speed, said overload device, upon failure of said motor due to stalling and the consequent failure of said pump to develop a pressure in said pressure responsive means sufficient to maintain said circuit-controlling means in the open position, opening said automatic switch means to stop said motor.

2. In combination, a motor provided with a running winding and a starting winding, a pressure lubricating pump driven by said motor for lubricating the bearings of said motor, a line switch for controlling the energization of said windings, a circuit opening means associated with said starting winding, fluid pressure means connected to said pump for opening said circuit opening means in response to a predetermined pressure produced by said pump, said pressure corresponding to substantially the running speed of said motor.

3. In combination, a hermetically sealed casing, a motor mounted within said casing, a running winding and a starting winding for said motor, a pressure lubricating pump mounted within said casing for lubricating the bearings of said motor and arranged to be driven thereby, a line switch for controlling the energization of said windings, an overload device responsive to the motor current for opening said line switch, a pair of contacts connected in series circuit with said starting winding and normally biased to the closed position, fluid pressure means for opening said contacts, and a conduit directly connecting said pump to said fluid pressure means so that said pressure means opens said contacts whenever the pressure generated by said pump corresponds to substantially the normal running speed of said motor.

LEONARD P. HUTT.